W. B. BALLOU.

BELT BUCKLE.

APPLICATION FILED DEC. 7, 1916.

Reissued June 19, 1917. 14,316.

Inventor

Walter B. Ballou by Geo. N. Goddard, Atty.

UNITED STATES PATENT OFFICE.

WALTER B. BALLOU, OF NORTH ATTLEBORO, MASSACHUSETTS, ASSIGNOR TO R. BLACKINTON & CO., OF NORTH ATTLEBORO, MASSACHUSETTS.

BELT-BUCKLE.

14,316. Specification of Reissued Letters Patent. Reissued June 19, 1917.

Original No. 1,183,425, dated May 16, 1916, Serial No. 67,339, filed December 17, 1915. Application for reissue filed December 7, 1916. Serial No. 135,699.

*To all whom it may concern:*

Be it known that I, WALTER B. BALLOU, a citizen of the United States, residing at North Attleboro, in the county of Bristol and State of Massachusetts, have invented a new and useful Improvement in Belt-Buckles, of which the following is a specification.

This invention comprises certain improvements in belt-buckles, and has for its object to provide a buckle of simple and efficient construction in which the strap-engaging and holding devices may be conveniently and readily assembled after the buckle plate or single piece body has been fully polished without marring its surface or finish. A further object is to provide such an arrangement and construction of parts as will be convenient to permit the sawing or piercing of the front plate, comprising the body of the buckle, for monograms or other fanciful designs, the gripping roller being constructed so as to be capable of insertion and removal at will. Still another feature consists in the provision made for facilitating the ready insertion and securing of the fixed or anchored end of the strap or plate, while also making it adaptable to straps of different thickness, whereby the front plate or body always lies snugly against the strap whether the strap be relatively thick or thin.

In the drawings—Figure 1 is a perspective view of the invention.

Figure 1:
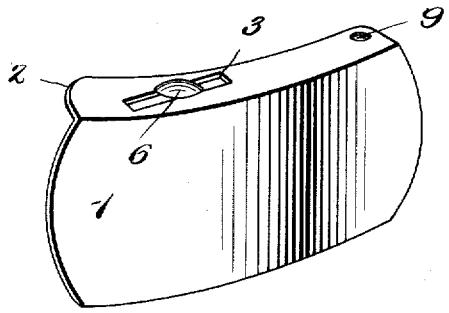
Figure 2:
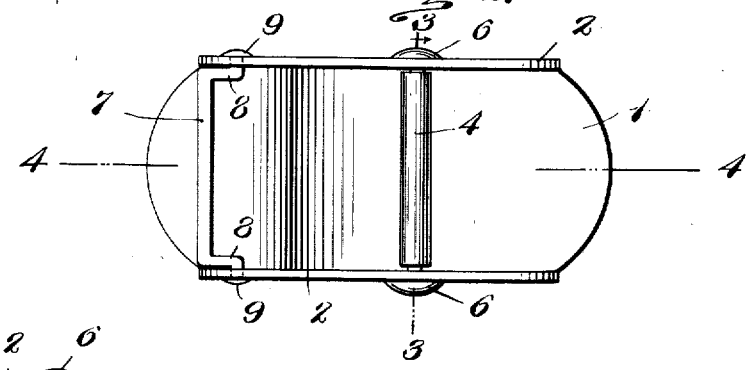
Fig. 2 is a rear plan view.
Figure 3:
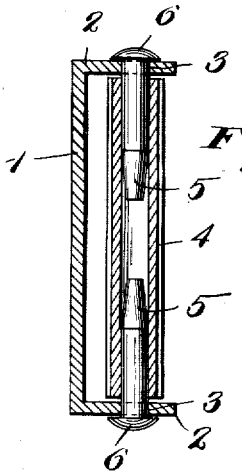
Fig. 3 is a section on the line 3—3 of Fig. 2.
Figure 4:
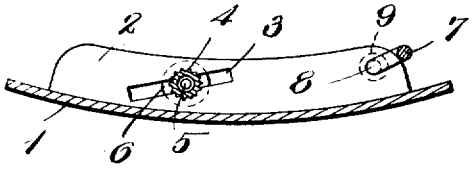
Fig. 4 is a similar view on the line 4—4 of Fig. 3.

The belt buckle shown comprises essentially the main or body member consisting of a single piece of metal forming the front plate 1 and having its opposite side edges inturned to form shallow flanges 2, in which are formed oppositely disposed slots 3 that are inclined or oblique to the front plate 1. The gripping roller has a hollow cylindrical body 4, corrugated peripherally, so as to effectively grip the free end of the belt and is connected to the body by means of pins having tapered ends 5 capable of being frictionally driven into the ends of the roller body 4 and having heads 6 outside of the flanges 2. These pins have sufficient frictional engagement with the walls of the bore of roller 4 so as to effectively secure the roller in position, for which they serve as removable journals.

The bail 7 has cranked ends 8 which latter are passed through bearing openings provided therefor in the flanges 2, and are headed at 9 after their ends 8 are passed through the bearing openings. It will be obvious that this pivoted arrangement of the cranked bail make it possible to easily insert the bail after the body has been polished by slightly springing the flanges apart. Furthermore, this arrangement of bail pivoted in the side flanges, facilitates the insertion of the fixed end of the strap between the bail and the plate, preparatory to anchoring this end of the strap to the bail. It will be seen moreover, that as the lapped or anchored end of the belt passes between the bail and the front plate, and the free end or tongue of the strap, which is held by the gripping roller, must also pass through this space, the belt is free to accommodate its position to different thicknesses of the leather, and yet the front plate or body will always lie snugly against the outside face of the strap. With this arrangement and construction the flanges need be of only slight depth, and the bail does not hinder the ready insertion of the free end or tongue of the strap when the belt is applied to the person, if the leather is a little thicker than ordinary, while if the leather is thinner than ordinary, the tension of the strap on the bail, tends to draw the front plate snugly against the outer face of the strap instead of allowing it to project away from the outer surface of the strap.

As there is no back plate to the buckle, the whole body can be made of a single piece of metal without the necessity of soldering together or otherwise assembling of parts to form the body, and thus the simple removal of the roller leaves the front plate fully exposed for cutting out the monogram. The absence of the back plate also serves not only to simplify the construction and render convenient the sawing out of the design therein, but in cases where precious metals are used, effects a decided economy of material.

What I claim is:

1. In a belt buckle, a body having side flanges provided with inclined slots and with openings, a bail having cranked ends passed through the openings and subsequently headed, and a hollow roller having tapered headed pins driven thereinto through the slots.

2. In a belt buckle, a body having flanges with inclined slots, a roller between the flanges, and pins driven into the ends of the roller so as to permit removal of the same, the pins extending through the slots.

3. A belt buckle embracing a body portion consisting of a front plate whose sides are inturned to form opposed integral flanges, said flanges being provided with opposed oblique slots, a clamping roller journaled to travel in said slots to clamp the free end of the strap against the inside face of the front plate, said flanges being also provided with opposed bearing openings, and a bail pivotally mounted in said bearing openings and serving as an automatically adjustable anchorage for the fixed end of the strap, substantially as described.

4. A belt buckle embracing a body portion comprising a front plate whose sides are inturned to form parallel integral flanges, said flanges being provided with opposed slots extending obliquely to the front plate, a clamping member adapted to travel in said diagonal slots to gradually approach the front plate and clamp the free end of the strap against the inside face thereof, a cranked bail member pivotally supported in said flanges near their ends, whereby the swinging movement of the bail tends to maintain the adjacent end of the buckle in close contact with the strap, substantially as described.

WALTER B. BALLOU.

DISCLAIMER.

14,316 (Reissue).—*Walter B. Ballou*, North Attleboro, Mass. BELT BUCKLE. Patent dated June 19, 1917. Disclaimer filed February 24, 1925, by the assignee, *R. Blackinton & Co.*

Hereby enters this disclaimer—

"To that claim forming part of the specification of said Letters Patent, which claim is numbered therein as claim 2 and which is in the following words, to wit:

"2. In a belt buckle, a body having flanges with inclined slots, a roller between the flanges, and pins driven into the ends of the roller so as to permit removal of the same, the pins extending through the slots."

[*Official Gazette March 10, 1925.*]